Figure 1:
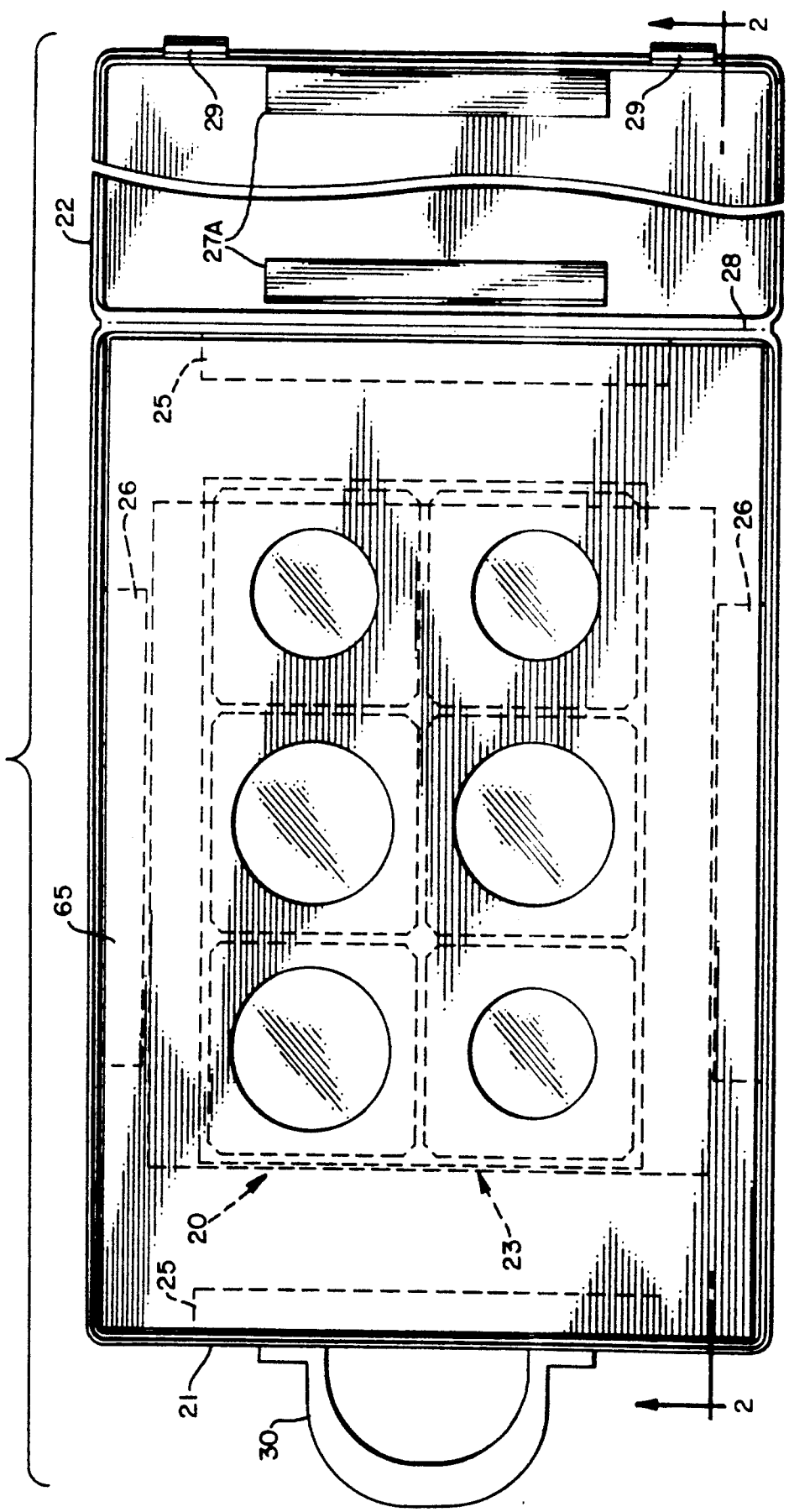

United States Patent [19]

Hardesty

[11] Patent Number: 5,222,893

[45] Date of Patent: Jun. 29, 1993

[54] INSTRUMENT PANEL CROSS CHECK TRAINING DEVICE

[76] Inventor: David L. Hardesty, 3575 N. Belt line #222, Irving, Tex. 75062

[21] Appl. No.: 726,045

[22] Filed: Jul. 5, 1991

[51] Int. Cl.⁵ .............................................. G09B 9/00
[52] U.S. Cl. ...................................... 434/29; 434/30; 434/43
[58] Field of Search .............................. 434/29, 30–38, 434/43, 44, 49–51, 258, 307; 359/315

[56] References Cited

U.S. PATENT DOCUMENTS

| | | | |
|---|---|---|---|
| 3,992,786 | 11/1976 | Greenberg et al. | 434/258 |
| 4,422,732 | 12/1983 | Ditzik | 359/315 |
| 4,559,705 | 12/1985 | Hodge et al. | 434/307 X |
| 4,652,870 | 3/1987 | Steward | 434/44 X |
| 5,009,598 | 4/1991 | Bennington | 434/35 X |

Primary Examiner—Richard J. Apley
Assistant Examiner—Glenn E. Richman
Attorney, Agent, or Firm—Warren H. Kintzinger

[57] ABSTRACT

An assemblage of instruments such as in an aircraft instrument panel, either actually in an aircraft or training simulator pictured in various states of activation, are positioned behind a selectively programmed viewing device. Various individual instruments are programmed for viewing (one or more) while the remainder of the instruments are obscured behind a ported plate having partial instrument indicia on the face thereof and with the pattern of instrument ports having individual windows individually actuated by a control circuit controlling timing and sequence. This is a training aid with timing and sequence viewing improving the viewing comprehension skills of a pilot or student pilot using the training device. One embodiment is a timed and sequentially controlled system using on and off back lighting of individual instruments of a translucent aircraft instrument panel portrayal in order to enhance a users instrument viewing skills. In another embodiment liquid crystal panels are controlled between white translucent scattering and optical clear modes for timed and sequenced through the port viewing of instruments controlled by varied settings of the control circuit.

11 Claims, 7 Drawing Sheets

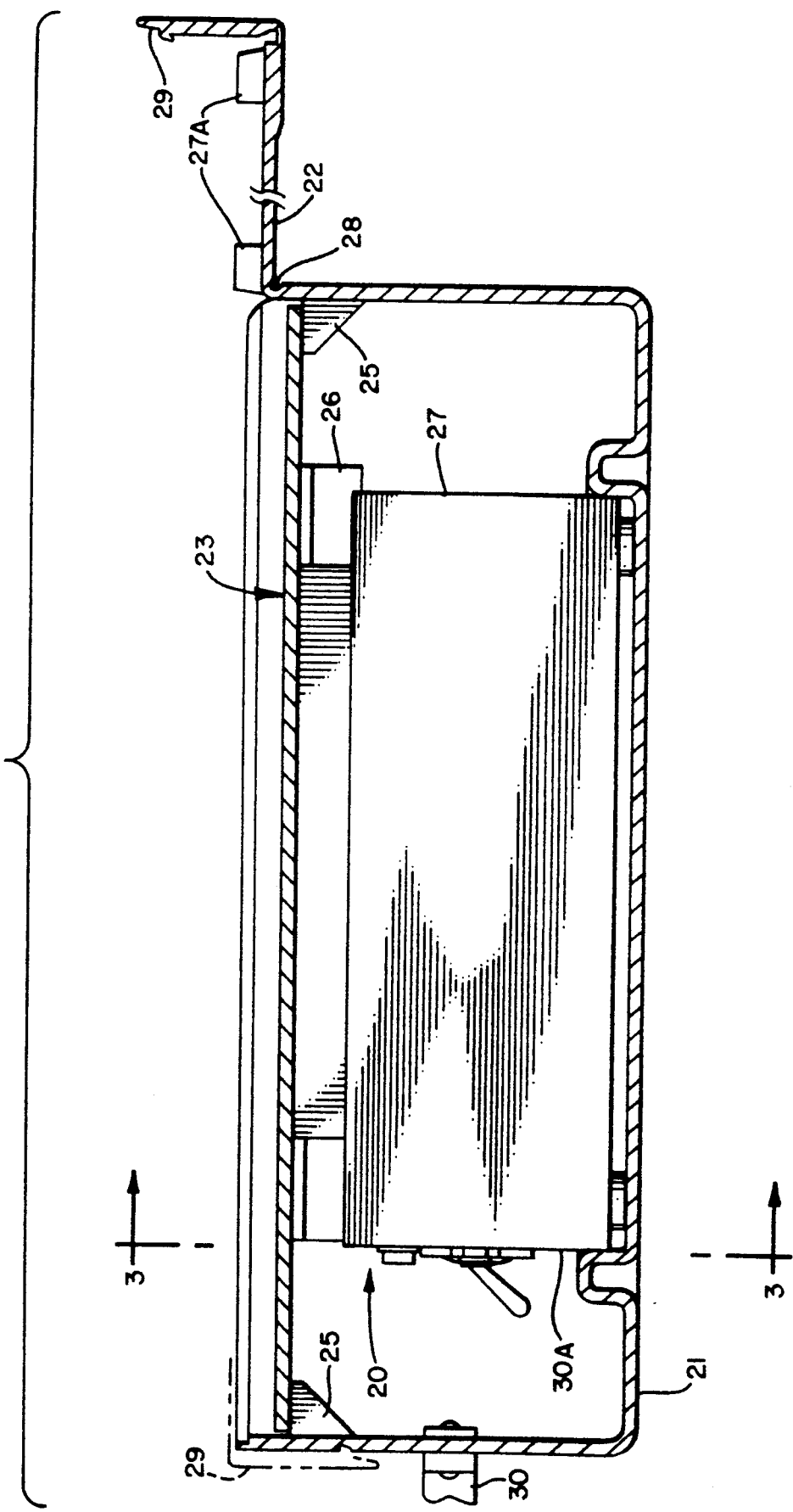

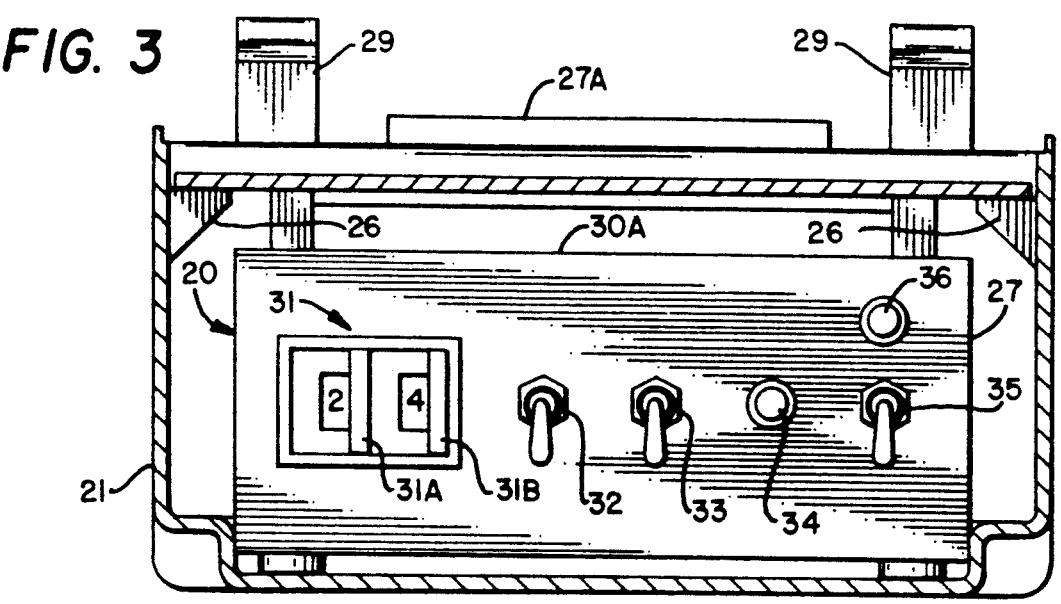
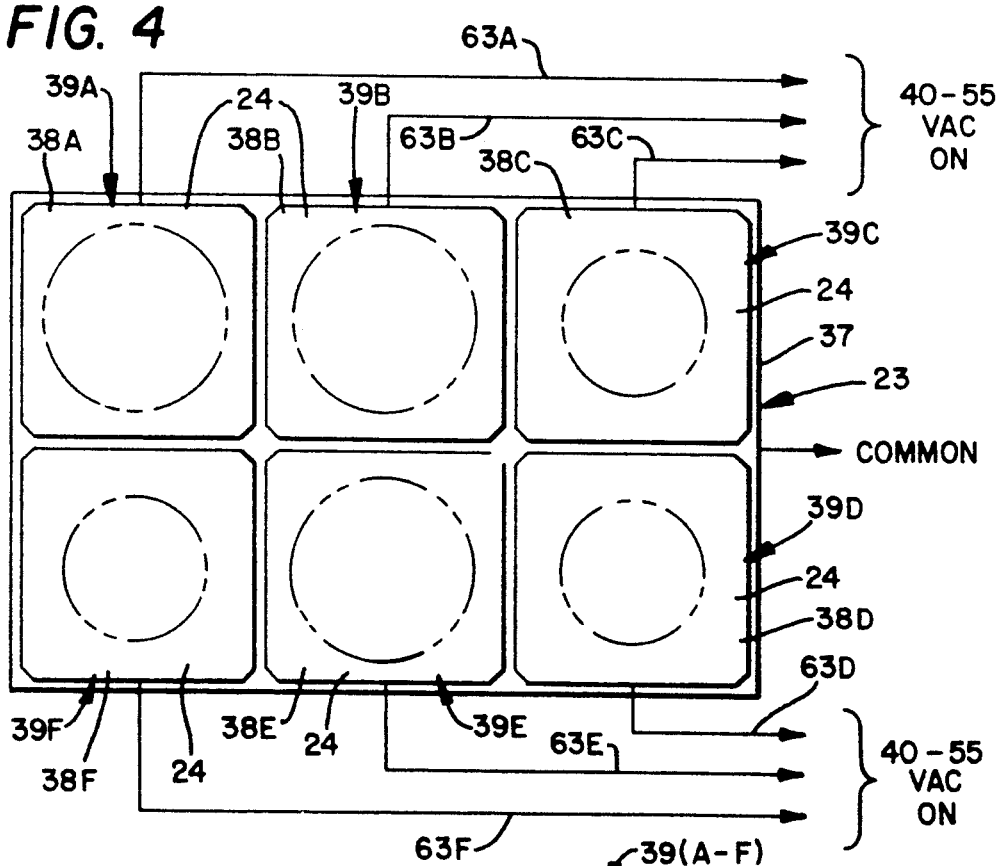
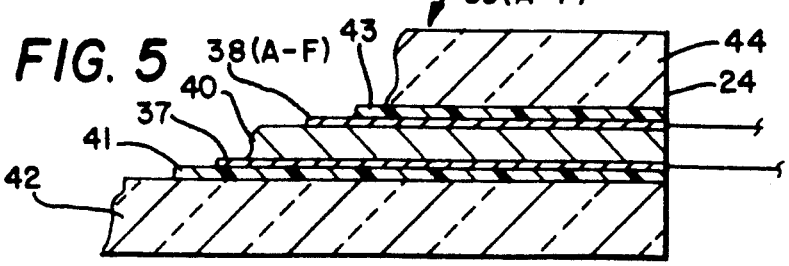

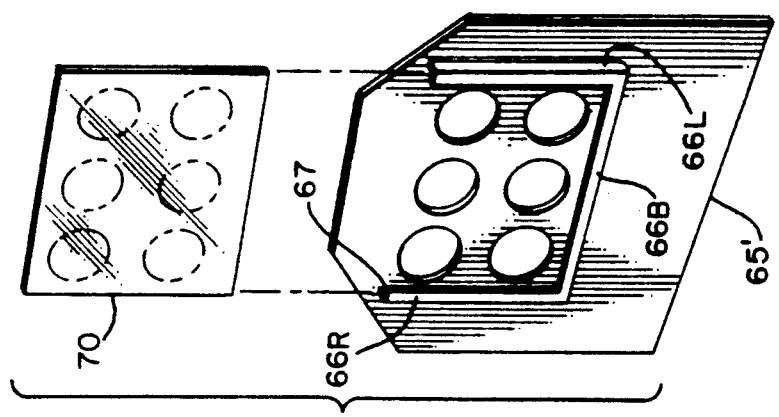
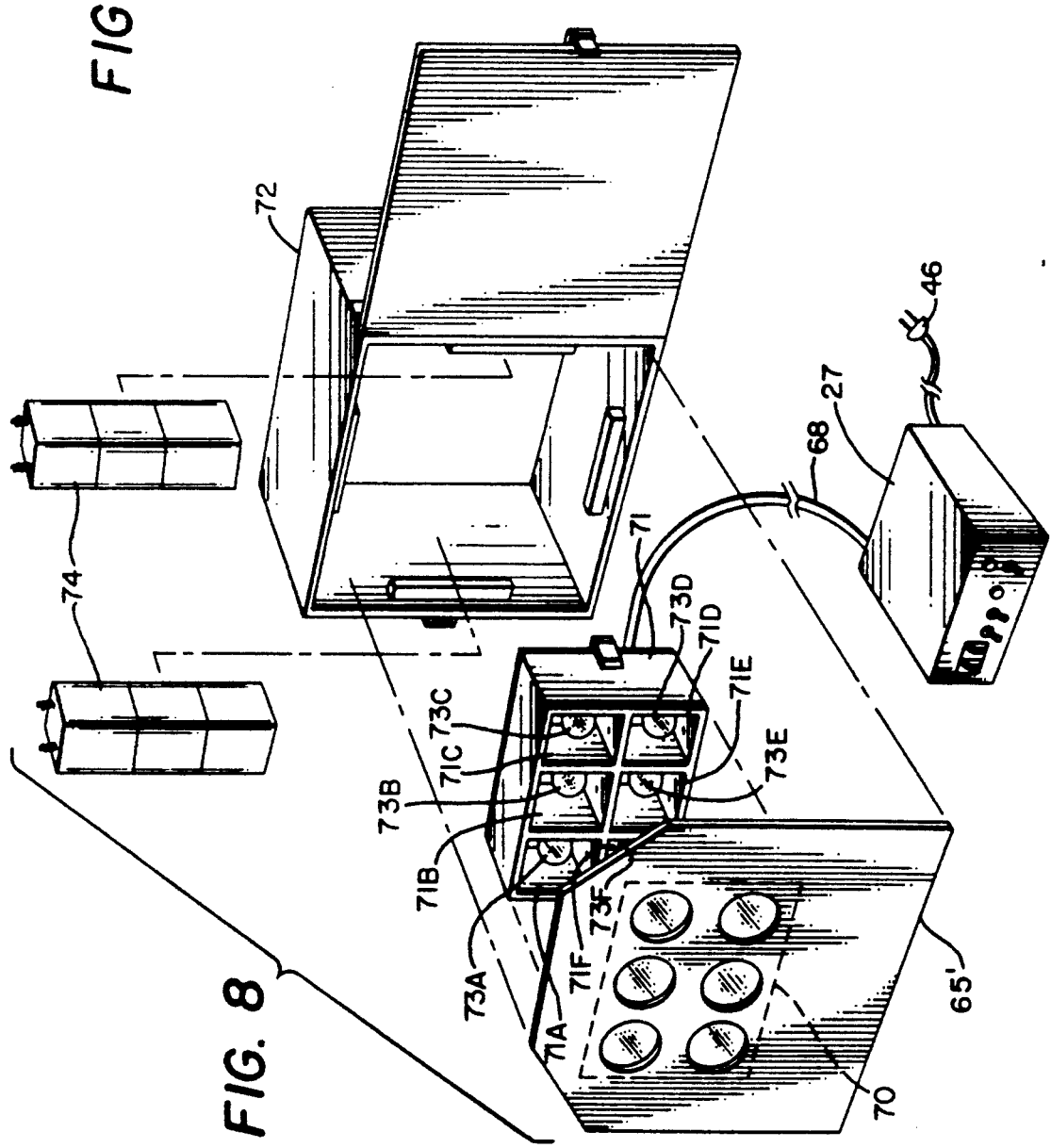

INSTRUMENT PANEL CROSS CHECK TRAINING DEVICE

This invention relates in general to instrument reading training, and more particularly, to an aircraft instrument panel cross check training device for pilots with various instruments displayed in short period on/off controlled intervals in sequential order as determined by a control circuit.

Aviation instrument flying is important and being proficient in instrument flying and being able to pass instrument cross checks for instrument flying is important for commercial pilots. It is important for a pilot to be able to scan an aircraft instrument panel efficiently, comprehending the instrument information portrayed in short intervals of time. Many instrument flying trainees have tended to develop various bad habits that must be overcome for them to develop into good proficient instrument pilots. Even experienced instrument flying qualified pilots at times develop habits that should be countered and periodically corrected, for example, instrument fixation developing without conscious awareness that can impair a pilots instrument flying proficiency. In aircraft flight training flight instrumentation operation is taught along with interpretation of instrument display in the aircraft. An aircraft instrument cross check is a very important phase of instrument flying with such cross checking a proper division of attention and interpretation of the information displayed on the flight instruments of any particular aircraft particularly equipped for instrument flying and especially blind flying.

It is therefore a principal object of this invention to optimize the division of attention and interpretation of the information displayed by instruments on the instrument panel of an aircraft.

Another object is to improve a pilots instrument flying abilities.

A further object is to counter and overcome bad habits a pilot may develop in instrument flying.

Still another object is to make instrument flight training more efficient, safer and less expensive.

Another object is to make a pilot more at ease in the instrument flight training environment with less stress and strain being experienced in the training environment.

Features of the invention useful in accomplishing the above objects include, in an aircraft instrument panel cross check training device, an assemblage of instruments such as in an aircraft instrument panel, either actually in an aircraft or training simulator or pictured in various states of activation, positioned behind a selectively programmed viewing device. Various individual instruments are programmed for viewing (one or more) while the remainder of the instruments are obscured behind a ported plate having partial instrument indicia on the face thereof and with the pattern of instrument ports having individual windows individually actuated by a control circuit controlling time and sequence. This is a training aid with timing and sequence viewing improving the viewing comprehension skills of a pilot or student pilot using the training device. One embodiment is a timed and sequentially controlled system using on and off back lighting of individual instruments of a translucent aircraft instrument panel portrayal in order to enhance a users instrument viewing skills. In another embodiment liquid crystal panels are controlled between white translucent scattering and optical clear modes for timed and sequenced through the port viewing of instruments controlled by varied settings of the control circuit. With still another embodiment instruments are displayed on the face of a CRT tube or on a back projection screen with liquid crystal panels placed before sections of the face of a CRT tube or a back projection screen being used. Video recording of the instrument panel portrayal through an entire aircraft flight can be displayed on the CRT tube face or on the back projection screen for use with the instrument training device.

Specific embodiments representing what are presently regarded as the best modes of carrying out the invention are illustrated in the accompanying drawings.

Figure 6:
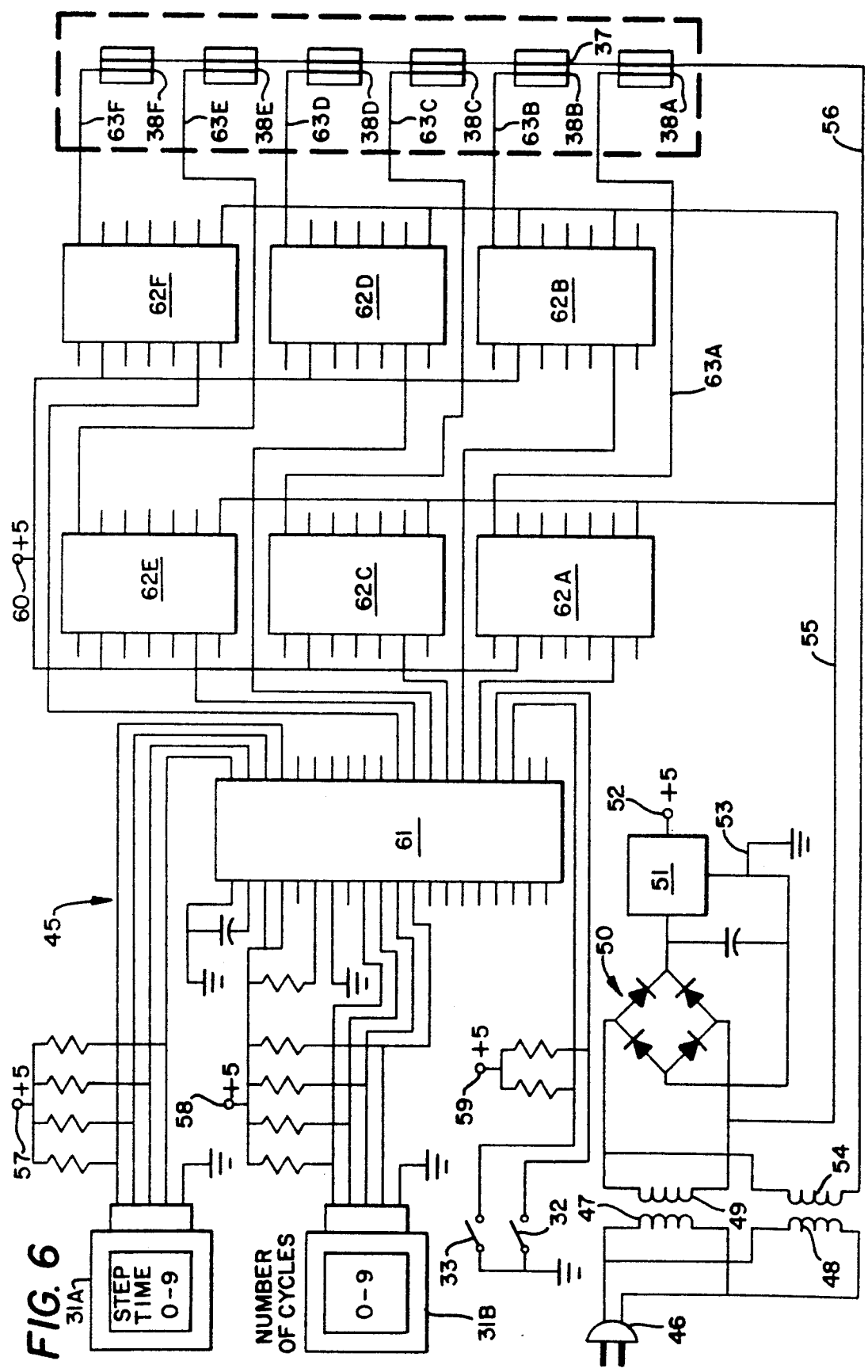
Figure 7:
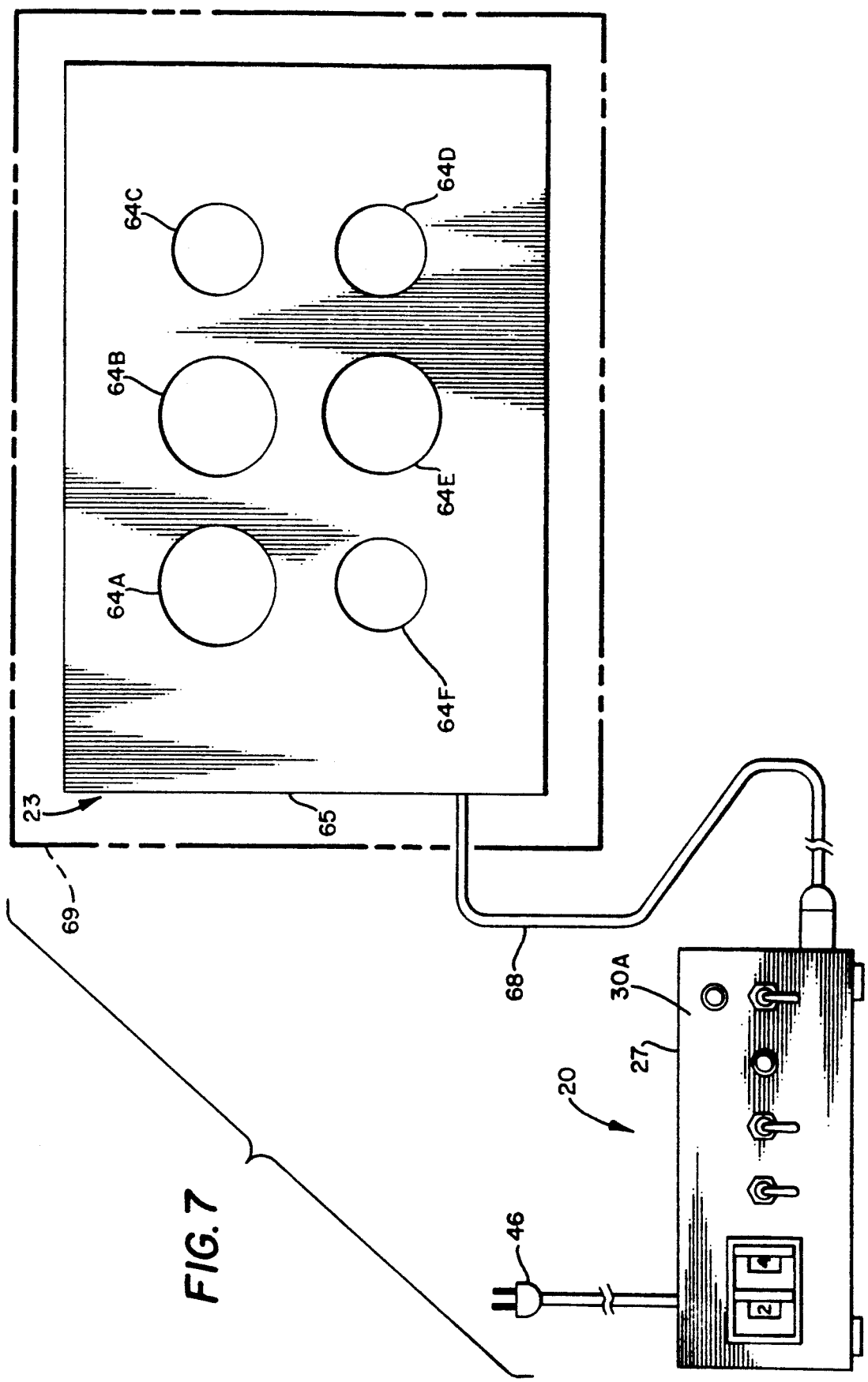
Figure 9:
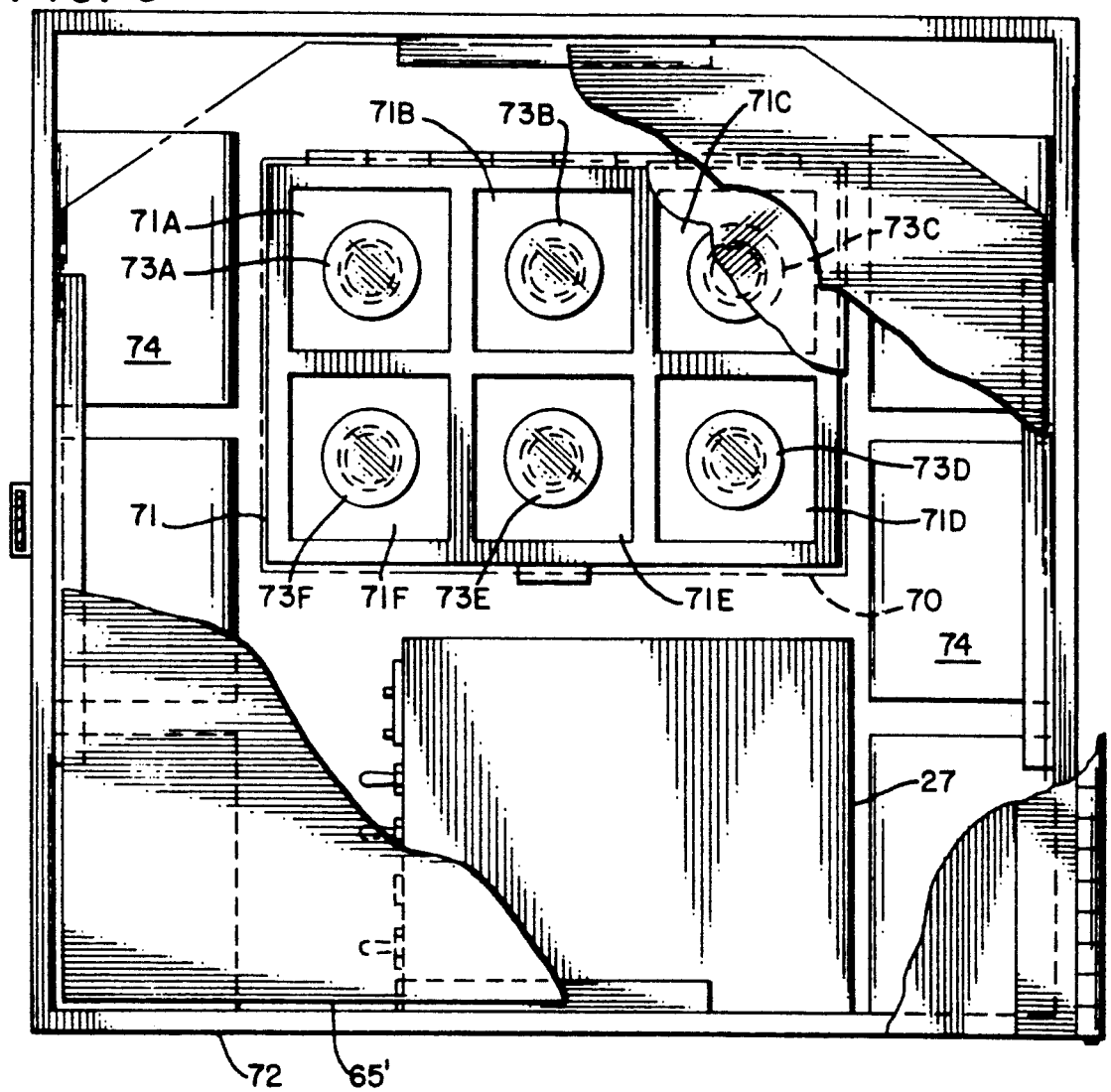
Figure 10:
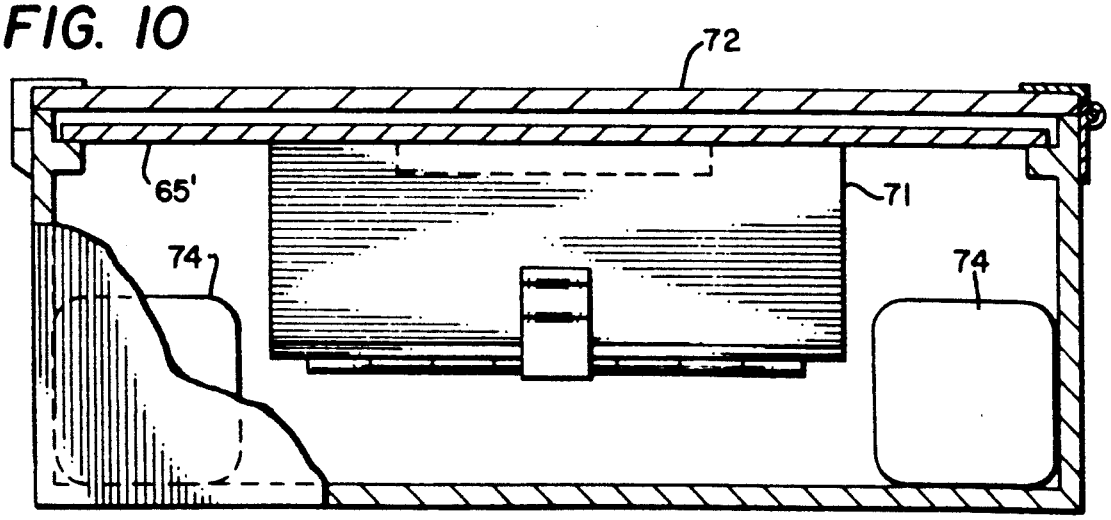

In the drawings:

FIG. 1 represents a top plan view of an aircraft instrument panel cross check training device with liquid crystal panels, individually controllable between translucent and optically clear modes, in a carrying case in the opened state;

FIG. 2, a cut away, along line 2—2 of FIG. 1, and sectioned side elevation view of the aircraft instrument panel cross check training device of FIG. 1 showing a control box in the carrying case below the liquid crystal panel structure;

FIG. 3, a cut away, along line 3—3 of FIG. 2, and sectioned front elevation view of the control box in the carrying case;

FIG. 4, a plan view of a multiple liquid crystal pad layout with circuit connections indicated;

FIG. 5, a partial cut away side elevation showing the multiple layer liquid crystal pad structure of FIG. 4;

FIG. 6, a control circuit schematic for the polymer dispersed liquid crystal (POLC) structure of FIGS. 4 and 5;

FIG. 7, a PDLC panel connected to a control box and placed before an aircraft instrument display panel image surface that is the face of a CRT tube or a back projection screen;

FIG. 8, an exploded perspective view of an aircraft instrument panel cross check training with timed and sequentially controlled on/off back lighting of individual instruments portrayed via translucent windows in a panel;

FIG. 8A, an exploded perspective view of the back of the translucent windowed panel of FIG. 8 and a six instrument portrayal mountable in a three sided grooved receptacle on the back of the windowed panel for ease of changing to different printed instrument portrayals;

FIG. 9, a partially broken away and sectioned top plan view of the aircraft instrument panel cross check training device in a box with battery pack power supply of FIG. 8; and, FIG. 10, a partially broken away and sectioned front elevation view of the aircraft instrument panel cross check training device in the box with battery pack power supply.

Referring to the drawings:

The aircraft instrument panel cross check training device 20 of FIGS. 1, 2 and 3 is carried in case 21, shown to have lid 22 open in FIGS. 1, 2 and 3, with the liquid crystal panel 23 having six liquid crystal pads 24 held in the top of the case interior by opposite end brackets 25 and opposite side brackets 26. Control box 27 is also shown in case 21 below the liquid crystal panel 23 that is held in place by case lid 22 resiliently compresible pads 27A when the lid is closed, pivoted to the closed state about flexible hinge 28, with latches 29 latched at the carrying handle 30 end of the case 21. The control box 27 has a front control panel face 30A with a timer cycle control section 31 with a display timer switch 31A and a number of cycles switch 31B, a continuous cycle switch 32, an "ALL ON" switch 33, a start button 34, a power switch 35 and an "ON" light 36.

Referring also to FIGS. 4 and 5 the interrelation of the ITO (Indian Tin Oxide) film layers, a common ITO layer 37 and individual ITO layers 38A, 38B, 38C, 38D, 38E and 38F are shown in the plan view of FIG. 4. There is an epoxy liquid crystal formulation layer 40 generally coextensive with the respective ITO layers 38 (A-F) and between each of the ITO layers 38 and the common ITO layer 37. The plurality of liquid crystal built up pads 39 (A-F) are further shown in the partial cut away side elevation showing of FIG. 5. Each multiple layer crystal pad structure 39 (A-F) includes a center liquid crystal epoxy formulation layer 40, a common ITO (Toray Polyester Q-76) film layer 37 below layer 40 and an ITO film 38 (A-F), respectively, above each individual layer 40, plastic layer 41 below ITO layer 37, and therebelow glass layer 42. There is a plastic layer 43 above the ITO films 38 (A-F) and a glass layer 44 thereabove. Referring additionally to the FIG. 6 control circuit 45 a sixty cycle 120 volt AC power source is connected through plug 46 to transformer coils 47 and 48 with secondary coil 49 connected across opposite terminals of four diode rectifier circuit 50 having opposite dc output terminals connected to dc voltage regulator circuit 51 with a plus 5 volt output terminal 52 and a ground connection 53. An additional secondary transformer coil 54 is series connected with secondary coil 59 to provide AC through lines 55 and 56 to the control circuit 45 and to the common ITO film layer 37. The plus five volt regulated dc output terminal 52 is connected to control circuit 45 dc terminal points 57, 58, 59 and 60 with dc points 57 circuit bias connected to the 0 to 9 second step timer switch 31A and to micro processor chip circuit 61. The plus five volt dc point 58 is bias connected to the 0 to 9 number of cycles switch 31B and to micro processor chip circuit 61. The plus five volt dc point 59 is bias connected to continuous cycle switch 32, the "ALL ON" switch 33 and the micro processor chip circuit 61. The plus five volt dc point 60 is connected as a dc power input to AC output control signal power controlling chip circuits 62 (A-F) with, respective, output Ac lines 63 (A-F) connected to individual ITO layers 38 (A-F).

The timer switch 31A is settable in 0 to 9 period intervals, with the intervals settable to different values, of on time that AC is applied through individual lines 63 (A-F) for individual ITO layers 38 (A-F) to make the liquid crystal formulation layer 40 of, respective, multiple layer liquid crystal pad structures 39 (A-F) transparent as opposed to being opaque for time internal viewing of the instrument showing therebehind. In an alternate embodiment liquid crystal formulation layers would be used that are transparent when no AC voltage is applied to associated ITO layers and translucent when AC voltage is applied. In addition the number of instrument scanning cycles can be set from 0 to 9 cycles by number of cycles switch 31B for control circuit 45 producing the set number of instrument viewing cycles. With different instrument viewing time interval settings along with varied numbers of viewing cycles being set performance of a pilots proficiency in flight instrument cross check as to flight instrumentation information perceived can be determined and with training practice improved.

In the control circuit 45 microprocessor 61 is typically a n68705 intergrated circuit (IC) chip 62A a DAIA058W IC, and chips 62 (B-E) are 1A05BW intergrated circuits. In each of the various embodiments presented herein the liquid crystal panel 23 is mounted on a six circular ported 64 (A-F) plate 65 with the circular ports 64 (A-F) spaced and sized to the aircraft panel display they overlay. The liquid crystal panel 23 can be mounted on either the front or the back of plate 65 except not on the back of 65' that, as shown in FIGS. 8 and 8A, has a three sided 66L, 66R and 66B grooved 67 receptacle on the back of plate 65' so it is more convenient to mount a liquid crystal panel 23 on the front of plate 65' if one were used.

The control circuit 45 is contained within the control box 27 that is connected via multi line cable 68, as shown in FIG. 7, to the liquid crystal panel 23 on plate 65 positioned in front of a cathode ray tube (CRT) face 69 for use in front of instruments displayed on the face 69. Alternatively, face 69 would be the viewing face of a back projection screen.

Referring again to FIGS. 8 and 8A and also to FIGS. 9 and 10 the plate static instrument indication portrayal 70, replaceable one for another, are received in three sided 66L, 66R and 66B grooved 67 receptacle backed by a six compartmented back lighting box 71 with the six compartments 71 (A-F). These are carried in a container 72 along with control box 27 that is removed from container 72 when the training system is being used. The control box 27 is the same as with the other embodiments with, however, line 56 connected through cable 68 in common to all the light bulbs 73 (A-F) and the lines 63 (A-F) connected individually as the other lead of each of the light bulbs 73 (A-F). Batteries 74 are also carried in container 72 for dc power with control box 27 modified for dc power control if desired. Light bulbs 73 (A-F) are rated to the voltage power supplied from control box 27.

Whereas this invention has been described with respect to several embodiments thereof, it should be realized that various changes may be made without departure from the essential contributions to the art made by the teachings hereof.

I claim:

1. An instrument panel cross check training device comprising: a multi-port plate with each port for display of a specific instrument of an instrument panel; instrument portrayal means activated to display respective instrument portrayals through the ports thereof in said multi-ported plate; instrument portrayal interval of time adjustment means: instrument portrayal cycle control means; number of cycle settable control means; control circuit means including said instrument portrayal interval of time adjustment means and said instrument portrayal cycle control means in a training aid with timing and sequence viewing improving the viewing comprehension skills of one using the training device; wherein said control circuit means is in a control box with multiple individual circuit line means connected to said instrument portrayal means activated to display respective instrument portrayals through the ports thereof in said multi-ported plate; said control box has a time cycle control section with a display timer switch; a number of cycles switch; and an open switch; said instrument portrayal means activated to display respective instruments portrayals through the ports thereof includes liquid crystals panels, controlled between white translucent scattering and optical clear modes for timed and sequenced through the port viewing of instruments, controlled by varied settings of said control circuit means; a printed sheet static display of the instruments portrayed is positioned behind said ported plate; holder means is provided behind said ported plate for holding individual printed sheet static displays of the instruments portrayed; and for positioning, one at a time, various printed sheet static displays of various instrument indications.

2. The instrument panel cross check training device of claim 1, wherein said on switch is an all on switch; a continuous cycle switch is included; a start button; a main power switch and an on light are also included on said control box.

3. The instrument panel cross check training device of claim 1, wherein an all on switch is included for turn on of the instrument portrayals, simultaneously, through all ports of said multi-port plate in addition to said on switch.

4. The instrument panel cross check training device of claim 1, wherein the instrument portrayals are of instruments used in an aircraft instrument panel and positioned in the same order as they would be positioned in an aircraft instrument panel.

5. The instrument panel cross check training device of claim 1, wherein said ported plate has partial instrument indicia on the face thereof; and with the pattern of instrument ports having individual windows individually actuated by said control circuit means controlling viewing time and viewing sequence.

6. The instrument panel cross check training device of claim 1, wherein said control circuit means is connectable to an AC power source; and said control circuit means has multiple individual circuit line means controlled for applying AC in selectively activating said liquid crystal panels.

7. The instrument panel cross check training device of claim 6, wherein said liquid crystal panels each include an epoxy liquid crystal formulation layer between a common indian tin oxide film layer and individual liquid crystal panel indian tin oxide layers; said common indian tin oxide layer and said individual liquid crystal panel indian tin oxide layers being connected to said multiple individual circuit line means controlled for applying AC in selectively activating said liquid crystal panels.

8. The instrument panel cross check training device of claim 1, wherein individual timed and sequential control is provided with back lighting means of individual instruments of a translucent aircraft instrument panel portrayal.

9. The instrument panel cross check training device of claim 8, wherein said back lighting means includes a multi-compartmented back lighting box with the multi-compartmented back lighting box having light source means containing box compartments equal in number and positioned to individually illuminate individual instruments of said translucent aircraft instrument panel portrayal as viewed through ports of said ported plate.

10. The instrument panel cross check training device of claim 9, wherein a plurality of individual translucent aircraft panel static portrayals showing different instrument information display situations are selectively placeable in holding means therefor on the back of said multi-ported plate.

11. The instrument panel cross check training device of claim 10, wherein said control circuit means is connectable to an AC power source; and said control circuit means having multiple individual circuit line means controlled for applying AC in selectively activating said light source means of individual compartments of said multi-compartmented back lighting box.

* * * * *